(12) United States Patent
Marcjan et al.

(10) Patent No.: US 7,636,890 B2
(45) Date of Patent: Dec. 22, 2009

(54) USER INTERFACE FOR CONTROLLING ACCESS TO COMPUTER OBJECTS

(75) Inventors: Cezary Marcjan, Redmond, WA (US); Andrzej Turski, Redmond, WA (US); Lili Cheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 11/188,555

(22) Filed: Jul. 25, 2005

(65) Prior Publication Data

US 2005/0256842 A1    Nov. 17, 2005

Related U.S. Application Data

(62) Division of application No. 10/609,104, filed on Jun. 26, 2003.

(51) Int. Cl.
*G06F 3/00* (2006.01)
(52) U.S. Cl. ...................................... 715/741
(58) Field of Classification Search .................. 715/741
See application file for complete search history.

(56) References Cited

U.S. PATENT DOCUMENTS

| | | |
|---|---|---|
| 5,423,034 A | 6/1995 | Cohen-Levy et al. |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,760,770 A | 6/1998 | Bliss et al. |
| 5,812,865 A | 9/1998 | Theimer et al. |
| 6,006,225 A | 12/1999 | Bowman et al. |
| 6,098,072 A | 8/2000 | Sluiman et al. |
| 6,401,097 B1 | 6/2002 | McCotter et al. |
| 6,434,550 B1 | 8/2002 | Warner et al. |
| 6,466,232 B1 | 10/2002 | Newell et al. |
| 6,501,491 B1 | 12/2002 | Brown et al. |
| 6,507,845 B1 | 1/2003 | Cohen et al. |

(Continued)

OTHER PUBLICATIONS

International Search Report dated Sep. 21, 2005 mailed Oct. 27, 2005 for PCT Application Serial No. PCT/US04/19987, 7 Pages.

(Continued)

*Primary Examiner*—Dennis-Doon Chow
*Assistant Examiner*—Le Nguyen
(74) *Attorney, Agent, or Firm*—Lee & Hayes, PLLC

(57) ABSTRACT

A computer object access control graphical user interface allows a user to set computer locations where a computer object may be accessed and other users who may access the computer object. The computer object may be a computer file, a computer message, person contact information, etc. The access control user interface may operate, for example, to save a computer object to one or more computer locations, and also to specify sharing of the computer object with one or more other users so that they can access the object. Saving a computer object and setting the sharing of it are together referred to as controlling access to the object, the former referring to where the object may be accessed from and the latter referring to who may access the object. This provides, therefore, a unified interface for selecting and displaying destinations that can be either a file store or a person, thereby unifying the control of access to a computer object.

14 Claims, 4 Drawing Sheets

U.S. PATENT DOCUMENTS

| | | |
|---|---|---|
| 6,513,046 B1 | 1/2003 | Abbott, III et al. |
| 6,549,915 B2 | 4/2003 | Abbott, III et al. |
| 6,553,358 B1 | 4/2003 | Horvitz et al. |
| 6,618,722 B1 | 9/2003 | Johnson et al. |
| 6,747,675 B1 | 6/2004 | Abbott et al. |
| 6,772,150 B1 | 8/2004 | Whitman et al. |
| 6,791,580 B1 | 9/2004 | Abbott et al. |
| 6,801,223 B1 | 10/2004 | Abbott et al. |
| 6,812,937 B1 | 11/2004 | Abbott et al. |
| 6,842,877 B2 | 1/2005 | Robarts et al. |
| 6,901,559 B1 | 5/2005 | Blum et al. |
| 6,917,937 B1 * | 7/2005 | Rubendall ...................... 707/5 |
| 6,990,482 B1 | 1/2006 | Piotrowski et al. |
| 7,058,890 B2 | 6/2006 | George et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0194164 A1 | 12/2002 | Morrow et al. |
| 2003/0046401 A1 | 3/2003 | Abbott et al. |
| 2003/0065724 A1 | 4/2003 | Clark |
| 2003/0154476 A1 | 8/2003 | Abbott, III et al. |
| 2004/0122849 A1 | 6/2004 | Nelson |
| 2005/0034078 A1 | 2/2005 | Abbott et al. |
| 2007/0203984 A2 * | 8/2007 | AlHusseini et al. ......... 709/205 |

OTHER PUBLICATIONS

Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994, pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on The Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearble Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al,. Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, pp. 94-104, vol. 265—No. 3.
Chris Phillips, et al., In Support of User Interface Design in the Rational Unified Process, AUIC 2002, 2002, pp. 21-27, vol. 7, Melbourne Australia.
A Savidis, et al., Designing user-adapted interfaces: the unified design method for transformable interactions, DIS'97, 1997, pp. 323-334, Amsterdam, The Netherlands.
Kenneth J. Mitchell, et al., A Framework for User-Interfaces to Databases, AVI'96, 1996, pp. 81-90, Gubbio, Italy.
International Search Report, PCT/US04/19987, Mailed Apr. 13, 2005.

* cited by examiner

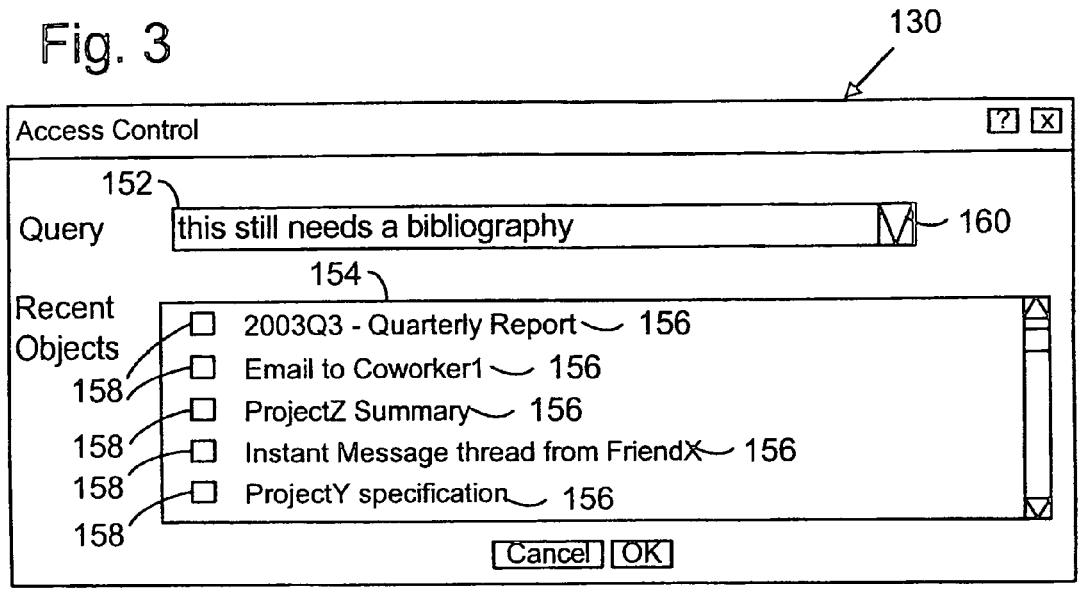
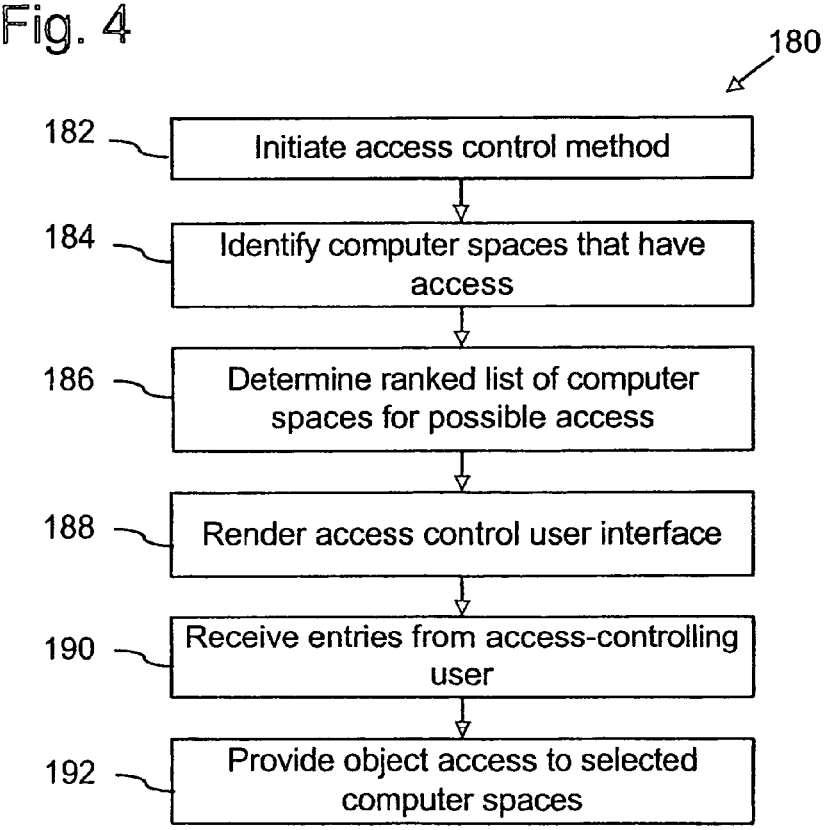

USER INTERFACE FOR CONTROLLING ACCESS TO COMPUTER OBJECTS

CROSS REFERENCE TO RELATED APPLICATIONS

This application is a divisional of U.S. patent application Ser. No. 10/609,104, filed Jun. 26, 2003 and entitled, "USER INTERFACE FOR CONTROLLING ACCESS TO COMPUTER OBJECTS." The entirety of the aforementioned application is incorporated herein by reference.

TECHNICAL FIELD

The present invention relates to user interfaces for accessing and controlling access to computer objects and, in particular, to a user interface for accessing or controlling access to computer objects in computer spaces relating to computer locations and computer users.

BACKGROUND AND SUMMARY

Computer objects (e.g., files) are commonly copied or saved from one computer to another. Computer messages are sent between computers. Computer users give each other access to or "share" different sets of computer files or different computer file directories.

Typically, the sharing of computer objects between users as a "share" is distinct from the saving of computer objects to computer (e.g. network) locations. This distinction relates to the traditional view that computer storage occurs at locations (e.g., drives, folders, etc.), while the sharing of computer objects relates to the security or accessibility of the object at that location. As a result, the user interfaces for saving computer objects to computer locations are distinct from the user interfaces for setting the sharing of the objects.

An aspect of the present invention is an appreciation that access to a computer object according to its computer location is analogous to who is accessing the object. The common aspect is accessibility to the object. Accordingly, the present invention provides a computer object access control graphical user interface for setting computer locations where a computer object may be accessed and users who may access the computer object. The computer object may be a computer file, a computer message, person contact information, etc.

The access control user interface may operate, for example, to save a computer object to one or more computer locations, and also to specify sharing of the computer object with one or more other users so that they can access the object. Saving a computer object and setting the sharing of it are together referred to as controlling access to the object, the former referring to where the object may be accessed from and the latter referring to who may access the object.

In one implementation, the user interface includes a name field indicating a name for the computer object and multiple access control fields that are rendered together and indicate multiple selectable computer spaces for the computer object. At least one of the computer spaces corresponds to a computer location, and at least one of the computer spaces corresponds to access to the computer object for one or more computer users. The present invention provides, therefore, a unified interface for selecting and displaying destinations that can be either a file store or a person, thereby unifying the control of access to a computer object.

In one implementation, the multiple computer spaces are listed in a ranked sequence, which can be based upon recency of user interaction with the computer spaces (i.e., locations or users) or according to associations to the computer object determined automatically from user computer interactions. Users can be represented by an email address, an instant messaging name, a full name, or any other person identifiers, and specific transports to the users can also be identified or specified.

Additional objects and advantages of the present invention will be apparent from the detailed description of the preferred embodiment thereof, which proceeds with reference to the accompanying drawings.

BRIEF DESCRIPTION OF THE DRAWINGS

FIG. 3 is a an illustration of a computer object access control graphical user interface for accessing a computer object computer from a location on a computer or received via computer communication.

FIG. 4 is a flow diagram of a computer-implemented computer object access control graphical user interface method.

DETAILED DESCRIPTION OF PREFERRED EMBODIMENTS

Figure 1:
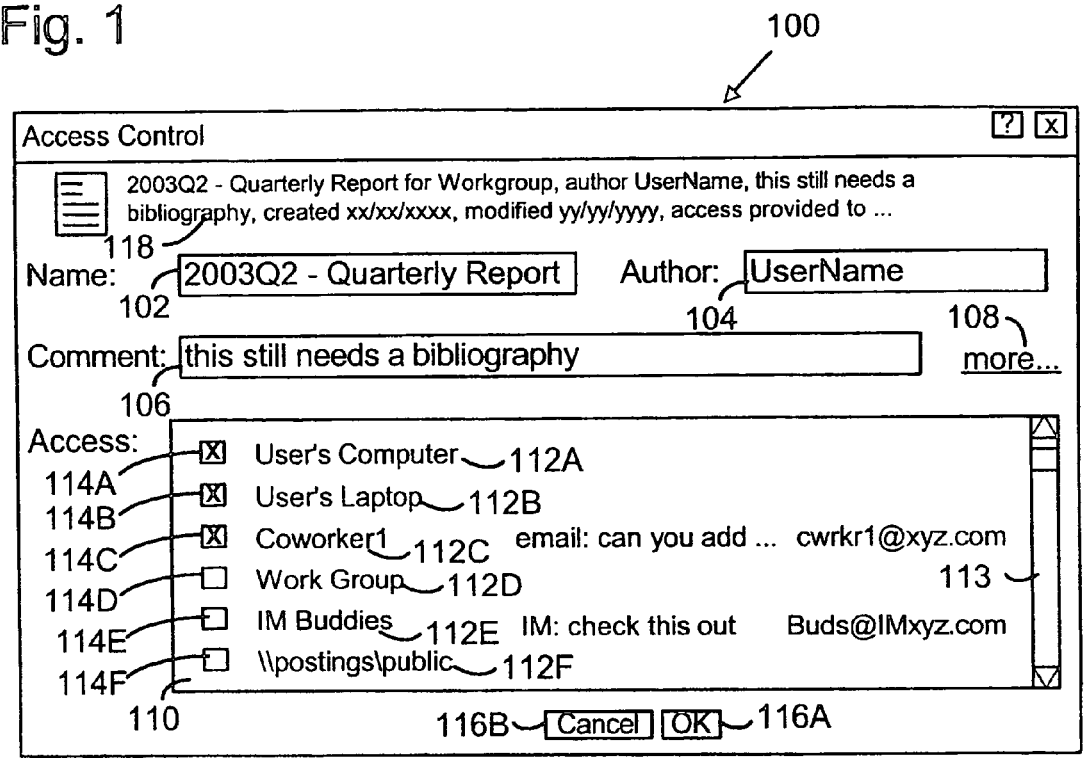
FIG. 1 is a an illustration of a computer object access control graphical user interface for setting computer locations where a computer object may be accessed and users who may access the computer object.

FIG. 1 is a an illustration of a computer object access control graphical user interface 100 for setting computer locations where a computer object may be accessed and users who may access the computer object. The computer object may be a computer file, a computer message, person contact information, etc.

Access control user interface 100 may operate, for example, to save a computer object to one or more computer locations, and also to specify sharing of the computer object with one or more other users so that they can access the object. Saving a computer object and setting the sharing of it are together referred to as controlling access to the object, the former referring to where the object may be accessed from and the latter referring to who may access the object. Access control user interface 100 may be generated from within any application or by a computer operating system whenever the access controlling user wishes to save the object to a specified location of share access with a specified other person.

Access control user interface 100 includes a name field 102 in which a name for the computer object can be entered, either automatically by a computer or manually by the user. An author field 104 specifies who created the computer object (e.g., a computer file, a computer message, person contact information, etc.) for which access is being set with user interface 100. An optional comment field 106 allows the user who is controlling access to the object (referred to as the access-controlling user) to enter and store a comment about the object, and an optional "more" link 108 gives the user access to optional additional fields for entering other properties relating to the object. The additional fields at "more" link 108 may include any or all of a creation date field indicating when the object was created, a modified field indicating when the object was last modified, any keywords, category names, etc.

An access control field 110 includes a listing or display of multiple computer spaces 112A-112F (referred to generally as computer spaces 112) that have or can be selected to have access to the computer object. Computer spaces 112 may refer to different portions of a computer network (e.g., public and private portions or "folders"), different computers, different computer access rights of different computer users, different computer users, etc. User interface 100 provides, therefore, a unified control over access to the computer object at computer spaces corresponding to computer users and computer locations.

For example, computer spaces 112A, 112B, and 112F reference computers or other locations on a computer network where access to the object may be provided. Computer space 112A indicates the controlling user's local or desktop computer, computer space 112B indicates the controlling user's portable or laptop computer, and computer space 112F indicates a location on a local or global computer network. It will be appreciated that these particular computer spaces 112A, 112B, and 112F are merely examples.

As additional examples, computer spaces 112C-112E reference computer users to whom access to the object may be granted. Computer space 112C indicates an individual (e.g., Coworker1) to whom the object is provided by email. Computer space 112D indicates a group of users (e.g., "Work Group") to whom the object may be provided, either by computer communication such as email or at a shared computer location. Computer space 112D indicates a group of instant messaging users or "buddies" who could be given access. The users of computer spaces 112C-112E can each be represented by an email address, an instant messaging name, a full name, or any other person identifiers, and specific transports to the users can also be identified or specified. A scroll bar 113 allows the access controlling user to scroll to other selectable computer spaces.

Access control indicators 114A-114F indicate whether each corresponding computer space 112A-112F has been selected to have access to the computer object. For example, access control indicators 114A-114C indicate that respective computer spaces 112A-112C have access to the computer object, and access control indicators 114D-114F indicate that respective computer spaces 112D-112F do not have access to the computer object. The access-controlling user provides access to any of computer spaces by graphical activation of the corresponding one of access control indicators 114A-114F. It will be appreciated that access control indicators 114A-114F may be implemented in any of a wide variety of graphical control formats.

User interface also includes controls 116A and 116B with which the access controlling user can accept or cancel access control changes, and optionally may include a summary region 118 listing a summary of information from various fields in the user interface.

In one implementation, the listing of computer spaces 112 in access control field 110 is ordered as a ranked listing of possible destinations for the computer object. The ranked listing may be based upon the computer spaces that the access-controlling user has most recently accessed or interacted with. In another implementation, the ranked listing may be based on the extent or strengths of associations to the object, such as associations to computer locations commonly used by the user, or people the user commonly works or communicates with, or user computer interactions that are identified automatically. Such associations and their relative strengths could be determined automatically, as described below in greater detail.

Figure 2:
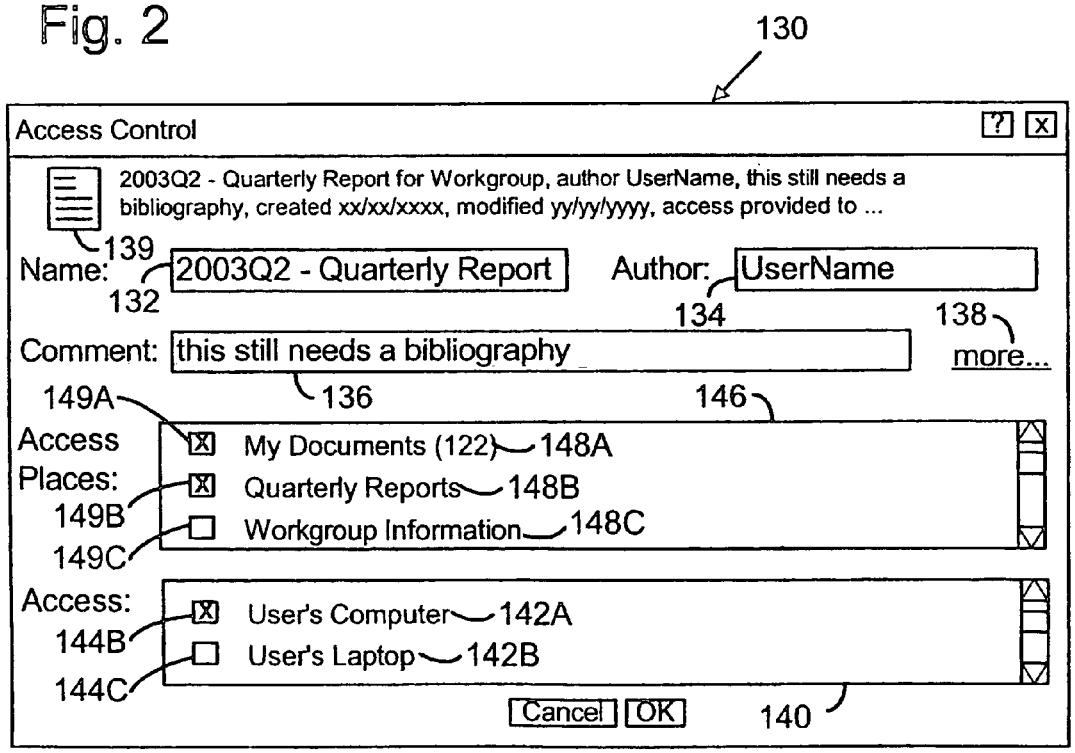
FIG. 2 is a an illustration of another computer object access control graphical user interface for setting computer locations where a computer object may be accessed and users who may access the computer object.

FIG. 2 is a an illustration of another computer object access control graphical user interface 130 for setting computer locations where a computer object may be accessed and users who may access the computer object. Access control user interface 130 includes a name field 132 in which a name for the computer object can be entered, either automatically by a computer or manually by the user. An author field 134 specifies who created the computer object (e.g., a computer file, a computer message, person contact information, etc.) for which access is being set with user interface 130.

An optional comment field 136 allows the access-controlling user to enter and store a comment about the object, and an optional "more" link 308 gives the access-controlling user optional additional fields for entering other properties relating to the object. An object type field 139 provides a type indication (e.g., graphical) for the computer object, specifying for example that the object is a word processor document, a picture, a spreadsheet, an audio or video file, etc.

An access control field 140 includes a listing of multiple computer spaces 142A, 142B (referred to generally as computer spaces 142) that have or can be selected to have access to the computer object. Computer spaces 142 are like computer spaces 112 (FIG. 1) and may refer to different portions of a computer network (e.g., public and private portions or "folders"), different computers, different computer access rights of different computer users, different computer users, etc. Access control indicators 144A, 144B are analogous to access control indicators 114 and indicate whether each corresponding computer space 142A, 142B has been selected to have access to the computer object.

Access control graphical user interface 130 further includes a category field 146 that includes a flat listing of categories 148A-148C in which the computer object is or may be selected to be included according to category control indicators 149A-149C. In one implementation, categories 148A-148C of category field 146 correspond to directories or folders of a hierarchical file structure of the type commonly used in the art.

The hierarchical file structure, or tree structure, is commonly rendered as successively indented file structure levels for successively nested levels of folders or directories. In the flat representation of category field 146, folders and directories are listed by their names as categories in a single level (i.e., flat) arrangement. This flat arrangement allows multiple folder or directories to be listed efficiently without requiring the display area to render the hierarchical file structure. In another implementation, categories 148 may also or alternatively correspond to keywords for organizing objects. Categories 148 may be ranked or ordered according to the recency with which they have been used or accessed by the user.

FIG. 3 is a an illustration of a computer object access control graphical user interface 150 for accessing a computer object computer from a location on a computer or received via computer communication.

Access control user interface 150 includes a query field 152 in which a query can be entered to retrieve one or more computer objects. Query field 152 may be configured to receive a general database-type query (as illustrated) or may be a graphical user interface to a hierarchical tree structure as is known in the art. As a database-type query, query field may receive or accommodate a chunk expression language format, for example.

As is known in the art, a chunk expression language format is a pseudo-natural language (e.g., English-like) that can be easily parsed by a computer into a formal query specification language, such as SQL. A sample chunk expression might be:

Show every email whose sender is 'John Smith' and whose subject contains "patent", which would be parsed by a computer into a formal query specification language, such as SQL as:

SELECT*FROM EMAIL WHERE SENDER='JOHN SMITH' AND SUBJECT LIKE '% patent %'

In general, a chunk expression might take the form of:

Show <selector><object-type>whose <property><comparator><value>* [<conjunction><property><comparator><value>]

A recent object field 154 lists in reverse chronological order computer objects 156 that have been accessed by the user. Recent object field 154 includes both objects obtained from computer locations, such a computer files, pictures, audio files, etc., and computer communication objects such as emails or other computer messages, which the user can select to access at access indicators 158. A drop-down control 160 allows a user to access recent past queries.

FIG. 4 is a flow diagram of a computer object access control user interface method 180. User interface method 180 is performed in response to computer software for that is stored in a computer readable medium for performing the steps of method 180.

In step 182, a user initiates an access control method for a computer object.

In step 184, any computer spaces that have already been given access to the computer object are identified. In FIG. 1, for example, access control indicators 114A-114C may indicate that computer spaces 112A-112C had already been given access to the computer object.

In step 186, a ranked listing of plural other spaces that could be given access to the computer object is determined. The ranked listing may be based upon which computer spaces were most recently used or interacted with, or may be based upon associations determined between the computer object and the various computer spaces.

In step 188, a computer object access control graphical user interface is rendered on a computer display screen.

In step 190, access control entries from an access-controlling user are received into the user interface and accepted by the user.

In step 192, access to the computer object is provided to the computer spaces indicated by the user.

It will be appreciated that method 180 and user interface 100 could also be used to remove access from one or more computer spaces, such as by the user de-selecting the computer space from the access field of user interface 100. For some computer spaces, such as a computer space corresponding to an email address of another user, de-selecting of access rights might not be feasible because the object has already been transmitted. In this situation, de-selection of the computer space may be indicated as unavailable in the computer space.

Figure 5:
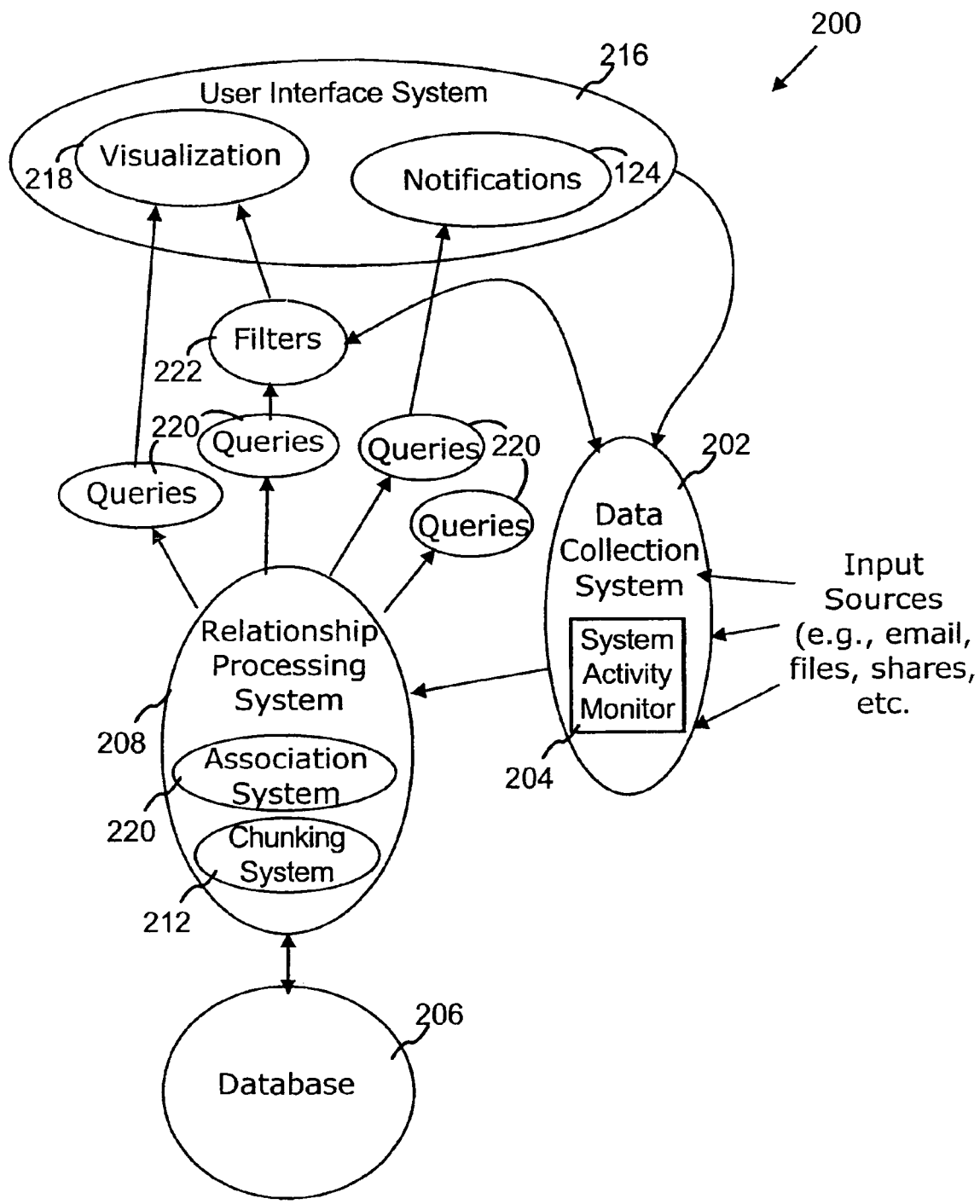
FIG. 5 is a functional block diagram of an automatic context association system that automatically determines context associations between user computer activities, computer objects (e.g., files, contacts, etc.), and other events.

FIG. 5 is a functional block diagram of an automatic context association system 200 that automatically determines context associations between user computer activities, computer objects (e.g., files, contacts, etc.), and other events. The context associations allow context association system 200 to provide users with automatic access to related computer files, contacts, and information (referred to generally as objects).

As described below, context associations between the objects may include similarities between them and their importance. The importance of and similarities between objects may be determined from user computer interactions with the objects. The user computer interactions may occur on a conventional desktop or laptop computer, or any other user-operated computing device such as a handheld computer, a digital cellular telephone, etc. For purposes of simplicity, these types of devices are referred to herein generally as computers. Context association system 200 may be implemented as software that is stored on and executed by one or more such computers.

Context association system 200 includes a data collection system 202 that collects data relating to user computer activities, computer actions, interactions between the user and various computer objects (e.g., applications, files, communications, etc.), and other events. For example, data collection system 202 may collect data relating to computer system events (e.g., the operation of applications or other software elements, various operations on computer files, sharing of computer data or other objects, etc.) computer communications (e.g., email communications, instant messaging communications, etc.), and external data (e.g., news, events, etc.)

In one implementation, data collection system 202 may include a system activity monitor 204, for example, that monitors user activity on a user-operated computer (not shown). System activity monitor 204 may be implemented as a computer program to which other applications, or the operating system, provide information of user computer activities, such as search queries, the opening or modification of a document or other file, etc. For example, while objects may exhibit many properties, searches performed by a user and the search results can indicate which properties are most important for the user. For each such activity, system activity monitor 204 creates or adds to a record of information (sometimes called "metadata") that is stored in a computer system database 206.

For example, system activity monitor 204 may include a universal input activity monitor that provides a single entry point for all user interactions with the computer, or at least specified user interactions with the computer. In this universal input implementation, system activity monitor 204 may determine and store as metadata in computer system database 206 any or all of the following: input method data (e.g., text, speech, mouse, etc.), input language data (English, Chinese, etc.), input mode data (e.g., dictation or typed command), input assistance data (e.g., typed word completion, command guessing, etc.), input feedback data (e.g., whether the computer needs additional information, corrections of wrong guesses by the computer, etc.), etc. For instance, if a user copies or stores a picture in a web browser, system activity monitor 204 could store the network address (e.g., Uniform Resource Locator, URL) of the source page, as well as the URL of the image itself, as metadata in computer system database 206.

Computer system database 206 stores information (e.g., "metadata") about computer files stored on and activities carried out on a computer. The metadata may include conventional information, such as is conventional for computer-generated documents, including when the file was created, who created it, and a modification history. Also, some types of computer file types may have specific metadata fields that are not applicable to other file types. For instance, the metadata fields for a photo file type may include the size of the image, where the picture was taken, who took it, who is in it, etc. In one implementation, new metadata fields can be added to database system 206 to accommodate new file types or to store new information about an existing file type.

Table 1A lists exemplary information that may obtained by system activity monitor 204 and stored in computer system database 206. With regard to the various computer files and computer information (referred to collectively as objects) a computer user might interact with, system activity monitor 204 may collect data relating to any or all of the creator/author of the object, the type of the object, any pointer to the object (if available), activation events, object size, etc. For example, system activity monitor 204 may obtain the information about the objects with which a computer user interacts, determine whether the objects are new or unique relative to other objects listed in computer system database 206 (e.g., based upon a unique object identifier), and aggregate or store the activities in computer system database 206 in association with the unique object identifier of the object.

TABLE 1A

Data Collection and Analysis

| Constructs | Data Collecting | Data Processing |
|---|---|---|
| Objects Users Interact With | | |
| General | creator/author of object, type of object, pointer to object if it still exists, activation events, object size | get information about objects, determine if new/unique & aggregate events at level of unique object ID |
| People | | |
| people in user's email | email client aliases | |
| people in user's contact list | contact list files | |
| people users IM, Chat with | buddy list email aliases | |
| Communications | | |
| Emails | email events (open, close), email addresses | |
| phone messages | phone message events (open, close), email alias | |
| instant messages | instant message (IM) session events (open, close), people | |
| chat messages | chat session events | |
| Files | | |
| any file created, opened, saved, played, sent, etc. | file names, place in directory | |
| Web items | | |
| web pages | URLs | |
| streaming items played | URLs | |
| Notifications | type of notification, response notification | |
| Applications | pointer to application | |

The objects with which the computer user interacts may be associated with other people, communications with other people, computer files, network or Web items, computer system notifications, and applications run on or accessible by the computer. System activity monitor 204 can obtain and store in computer system database 206 for each of the listed types of exemplary information.

Context association system 200 includes a relationship processing system 208 that determine one or more relationships between objects or metadata obtained by data collection system 202 or stored in computer system database 206. In one exemplary implementation, relationship processing system 208 includes a similarity or association system 210 that determines a degree of similarity or association between at least a pair of computer files or objects. Similarity or the degree of association may be represented, for example, as a numeric value between 0 and 1, where 1 would be identity between objects and 0 would indicate they are completely unrelated. Association system 210 may be implemented as one or more programs that, for a given target file and a collection of other files, return a similarity ranking between them.

It will be appreciated that different types of documents, files, or objects can have different types of similarity. For instance, two photos can look similar, could be taken at similar times, could be of a similar person, place, or event, could be the same color, could have been sent to the same people or printed together, could be parts of the same photo (e.g., one could have been cut from the other), etc. Table 1B lists exemplary associations or similarities that association system 210 may identify and store in computer system database 206. As indicated, the associations or similarities may relate to objects or files having shared content, occurring at similar times or similar computer locations (e.g., computer, directory, etc.), being sent to or received from a common person, are be linked together.

TABLE 1B

Data Collection and Analysis

| Constructs | Data Collecting | Data Processing |
|---|---|---|
| Context: Associations between Objects | | |
| Having shared content | | |
| | cut/paste event, insert event, objects saved as event, objects | |
| Occurring near in time | | |
| open on same machine at same time | open/close activation events, objects, date time of events | distance across times, overlapping sessions |
| Occurring near in "place" | | |
| on same machine | machine name | |
| near each other in directory | place in directory structure | Min number of jumps through tree from one to the other |
| near each other in web | link event, links from, links to | store metadata in computer system database |
| on the same email | attachment events, objects | aggregate at level of communication |
| Being sent/received to one another | | |
| item sent to another person pointer of item sent to another person | sent event, objects insert event, objects | |
| opened by a person | open event, objects | |
| saved by a person | save event, objects | |
| Activating one from within the other | | |
| items downloaded from a web page | download event, objects | |
| linked via a URL | link event, objects, link from, link to | |

In one implementation, association system 210 could be instructed to ignore certain types of similarity, or to weight one type of similarity more heavily than another. Moreover, the associations or similarities tracked and identified by association system 210 could be extensible.

In addition, objects with which a user interacts can be of a different importance or significance to the user. For instance, a document that a user keeps open and edits of an extended period could be deemed to be of greater importance than a document that is opened for only a brief period of time. Likewise, a photo that is accessed and opened repeatedly could be deemed to be of greater importance that a photo that is only opened once. Table 1 C lists exemplary factors by which association system 210, for example, could determine and store in computer system database 206 the relative importance of objects. As indicated, the importance factors may relate to the duration of user interactions, the frequency of interactions, the recency of interactions, as well as the immediacy of user responses, the amount of copying, duplication, and backups, and the extent objects are shared.

TABLE 1C

Data Collection and Analysis

| Constructs | Operationalization | |
| --- | --- | --- |
| | Data Collecting | Data Processing |
| Importance of Objects | | |
| Duration of interaction | | |
| | open and close activation events, object | session times calculated by mm max time/ date, then summed by object |
| | keyboard events, mouse events, object | summed by object |
| Frequency of interaction | | |
| | activation events, date/times | count of unique activations/sessions |
| Recency of interaction | | |
| | activation events, date/times | get maximum date |
| Immediacy of response to | | |
| | | difference in time |
| Copying, duplication, backups | print, save as, multiple versions | |
| Sharing | show during meeting, share via email, etc. | |

Relationship processing system 208 may further include a chunking system 212 that uses the degrees of similarity or association determined by similarity or association system 210 for an arbitrarily large set of objects or files and groups or "chunks" them into a specified number of sub-groups. For instance, given 200 photos, chunking system 212 could separate them into any number of sub-groups or chunks based on one or more criteria such as the dates they were taken, or who is in the photos, for example. The criteria to be used by chunking system 212 may be pre-defined or specified by a user, for example, and in one implementation can place the same item into several chunks (e.g., a picture of Bob and Sue would go into a Bob chunk as well as a Sue chunk). Chunking system 212 may be implemented as one or more programs stored on the computer.

A context association user interface system 216 utilizes information stored in computer system database 206 by system activity monitor 204, as well as information determined by similarity or association system 210 and chunking system 212 to display visualizations 218 illustrating context associations between computer system files, computer information, and other information. Visualizations 218 may be based upon the results of database queries 220 to which, in some instances, data filters 222 are applied. In addition, user interface system 216 can provide application and system notifications 124, as described below in greater detail.

Accordingly, context association system 200 accommodates innate human memory, which works by association so that events are often remembered as happening in relationship to other events. In contrast, conventional computer file systems force users to use and remember arbitrary, out-of-context filing structures. With the significant numbers of computer files and objects that many users interact with, conventional out-of-context tiling structures can make it difficult, or impossible, for users to find and access computer information that was worked on or viewed in the past. Context association system 200 allows a user to view and assign searchable metadata and to retrieve documents, objects or files that match selected metadata.

Figure 6:
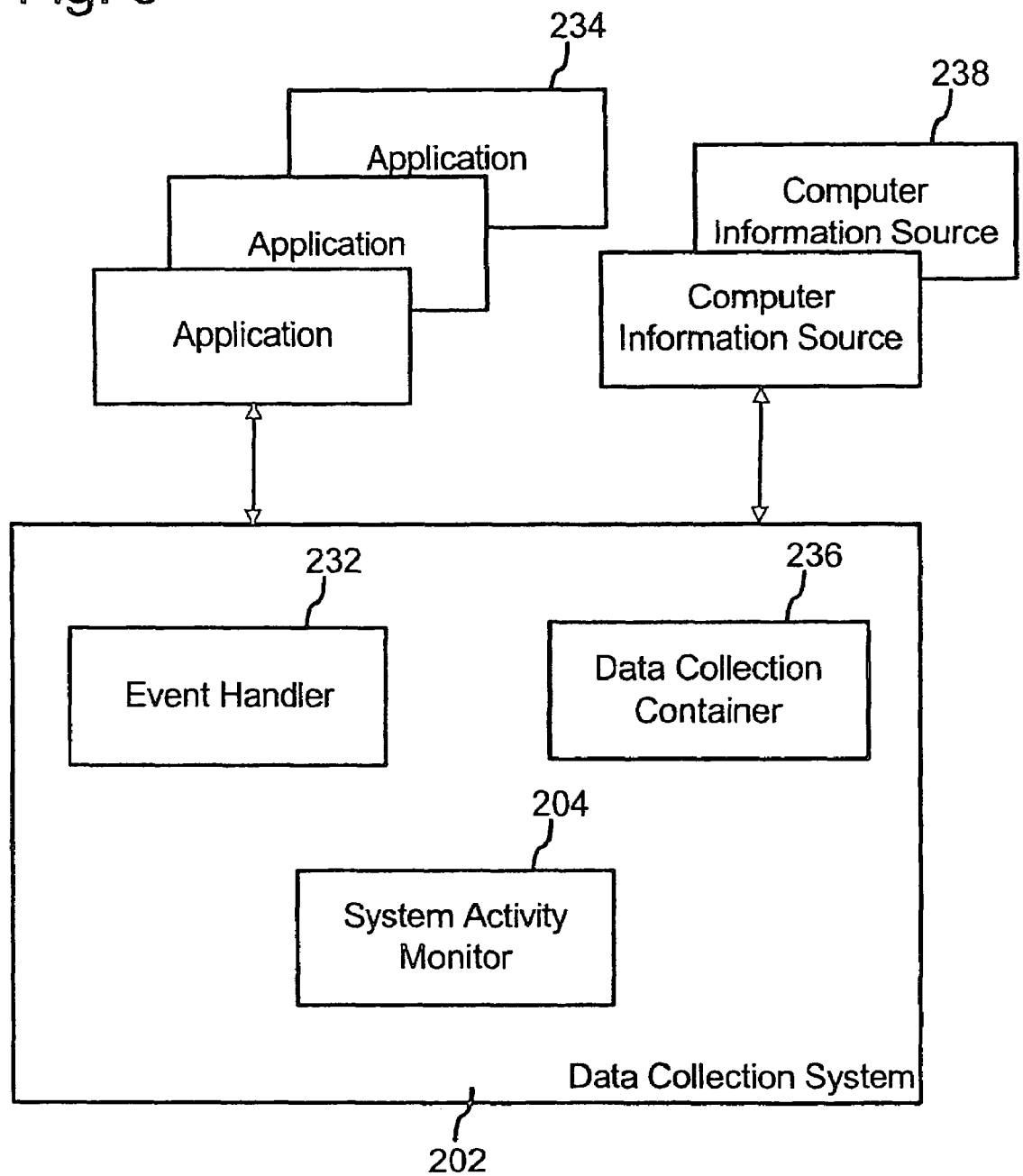
FIG. 6 is a detailed block diagram of one implementation of data collection system.

FIG. 6 is a detailed block diagram of one implementation of data collection system 202. In addition to system activity monitor 204 for monitoring user computer activity, for example, data-collection system 202 can also include any or all of the following, including an event handler 232 through which one or more applications 234 (including other software services) send metadata information about application events to data collection system 202 and receive metadata information about application events from data collection system 202. Applications 234 may be separate from an underlying operating system for the computer, or may be services or features provided by the operating system.

A data collection container 236 operates to control system activity monitor 204, event handler 232, and any other data collection modules, and particularly controls data collection relating to system activity, copy and paste between documents, incoming and outgoing messages, opening shared files, etc. In addition, data collection container 236 can operate to obtain or receive common data (like weather, news), other than data relating specifically to operation or use of the computer, from one or more separate computer information sources 238 (e.g., public servers).

Applications 234 running on a computer with automatic context association system 200 could register with event handler 232 to receive enhanced document management functionality. In particular, data collection container 236 supports cross-application integration that allows collection of data or information about cross-application events, such as copy and paste between documents, attaching a document to an email message, etc., thereby allowing relationships between objects to be determined or derived by relationship processing system 208. Moreover, applications 234 can interact directly with data collection system 202 to provide contextual information not readily available to system activity monitor 204. For example, if an email attachment is saved to disk as a separate file, the email application 234 may create a link between this file and the original email message (and, by extension, with the message sender). Control system activity monitor 204 and event handler 232 allow data to be collected at high efficiency and at a high granularity level, and with the minimal amount of processing required. In addition, data collection system 202 in one implementation may be extensible to allow for the installation of additional data collectors that may be developed in the future.

In one implementation users are notified that the data is collected and what it is used for. Users are provided one or more controls to selectively enable or disable the data collection, or explicitly adjust the importance of objects and their association weights, as described below. In other implementations, the ways in which the data is collected may be modified automatically based on how the data is used. While data is typically collected at the level of an individual user and computer, it will be appreciated that the data from multiple users and their computers could be combined. For such a shared data implementation, system 200 will provide unique identifiers for the data, objects and sessions, consistent handling of to- and from-fields for communications, replication of event identifiers across computers in shared sessions, privacy, and so forth.

In accordance with the practices of persons skilled in the art of computer programming, the present invention is described above with reference to acts and symbolic representations of operations that are performed by various computer systems and devices. Such acts and operations are sometimes referred to as being computer-executed and may be associated with the operating system or the application program as appropriate. It will be appreciated that the acts and symbolically represented operations include the manipulation by a CPU of electrical signals representing data bits, which causes a resulting transformation or reduction of the electrical signal representation, and the maintenance of data bits at memory locations in a memory system to thereby reconfigure or otherwise alter the computer system operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

What is claimed is:

1. A method for automatically controlling access to one or more objects, comprising:
    employing at least one processor to execute computer executable instructions stored on a computer readable medium to perform the following acts:
        monitoring computer system activity to collect context data;
        storing metadata indicative of the context data;
        employing the metadata to create associations between objects; and
        automatically controlling access to an object based on the object's associations with other objects, wherein controlling access to the object comprises setting object sharing controls.

2. The method of claim 1, wherein employing the metadata to create associations further comprises chunking the objects into sub-groups based on one or more criteria.

3. The method of claim 1, wherein employing the metadata to create associations further comprises determining a relative importance of the objects.

4. The method of claim 1, the context data being at least one of user computer activities, computer actions, interactions between the user and computer objects, computer system events, computer communications and external data.

5. The method of claim 1, wherein the associated objects are at least one of computer files and contacts.

6. The method of claim 1, further comprising supplying contextual information not readily available to the computer system.

7. The method of claim 1, wherein the context data is collected from multiple users.

8. The method of claim 2, wherein the one or more criteria can be defined by a user.

9. The method of claim 1, wherein the associations between objects is based upon similarity between objects.

10. The method of claim 9, further comprising applying weightings to indicate a degree of similarity between objects.

11. The method of claim 10, further comprising sorting objects based upon their applied similarity weightings.

12. The method of claim 1, further comprising notifying a user that one or more associations have been created between an object and one or more objects associated therewith.

13. The method of claim 12, further comprising, in response to a notification of object association, selectively enabling or disabling the association.

14. The method of claim 1, wherein the associations are created across applications supporting cross-application object integration.

* * * * *